United States Patent [19]

Balstad

[11] 4,429,449

[45] Feb. 7, 1984

[54] ASSEMBLY AND DISASSEMBLY OF ROLLER SKATE COMPONENTS

[76] Inventor: Edward Balstad, P.O. Box 90, Cambridge, Wis. 53523

[21] Appl. No.: 282,375

[22] Filed: Jul. 13, 1981

[51] Int. Cl.$^3$ ........................ B23P 11/02; B23P 19/00

[52] U.S. Cl. ........................................ 29/446; 29/526 R

[58] Field of Search ............................ 280/11.2, 11.28; 81/5.1 R, 1.1 B; 29/446, 526 R, 522 R, 426.5

[56] References Cited

U.S. PATENT DOCUMENTS

| | | | |
|---|---|---|---|
| 2,187,929 | 1/1940 | Blanc | 81/5.1 R |
| 2,354,480 | 7/1944 | Rossmann | 81/5.1 R |
| 2,466,070 | 4/1949 | Balstad | 280/11.28 |
| 2,595,751 | 5/1952 | Balstad | 280/11.28 |
| 2,920,899 | 1/1960 | Crone | 280/11.28 |
| 3,781,970 | 1/1974 | Ferdriksson | 29/446 |
| 3,870,324 | 3/1975 | Balstad | 280/11.28 |
| 4,150,477 | 4/1979 | Orr | 29/526 R |

*Primary Examiner*—Howard N. Goldberg
*Assistant Examiner*—Steven E. Nichols
*Attorney, Agent, or Firm*—Andrus, Sceales, Starke & Sawall

[57] ABSTRACT

A roller skate foot plate has downwardly depending sockets which receive resilient cushion blocks therein. An axle is seated in the lower end of each cushion block. A bolt passes axially through the cushion block and through an opening in the axle. In assembling and disassembling the device, the cushion block is compressed between the socket and axle to permit free rotatable application to or removal of a nut from the bolt.

1 Claim, 5 Drawing Figures

ASSEMBLY AND DISASSEMBLY OF ROLLER SKATE COMPONENTS

U.S. PRIOR ART OF INTEREST

Balstad, U.S. Pat. No. 3,870,324; Issued Mar. 11, 1975.

BACKGROUND AND SUMMARY OF THE INVENTION

This invention relates to the assembly and disassembly of roller skate components, and particularly as related to the roller skate construction of the above-identified U.S. Pat. No. 3,870,324.

In that patent, a roller skate includes a foot plate having downwardly depending sockets which receive resilient cushion blocks therein. An axle is seated in the lower end portion of each cushion block. The axle and cushion block are secured together by a bolt and nut assembly, with the bolt passing axially through the cushion block and also through an opening in the axle. The cushion block is held in position between the socket and the axle by a nut disposed adjacent the axle with the resilient block forces tending to keep the axle and block in assembled relationship by preventing the nut from unscrewing.

Up to now, it has been difficult to effectively assemble the axle to the cushion block and foot plate because the nut must be threadably tightened down against the outward axial biasing force of the resilient cushion block and axle. Likewise, disassembly has proven difficult because the said biasing force tends to bind the nut and keep it from turning.

The present invention is directed to a solution to the above-mentioned problem.

In accordance with a broad aspect of the invention, the cushion block is axially compressed to permit free threadable rotation of the nut on the bolt shaft. During assembly, the cushion block is first compressed axially and the nut applied onto the bolt, at which time the compressive forces are then released, causing the nut to be bindingly tightened to the bolt. During disassembly, the cushion block is compressed, thereby freeing the nut so that it is loose on the bolt and can be easily removed therefrom. The compression is then released.

In accordance with another aspect of the invention, the compressive forces are applied to the cushion block by moving the seated axle axially of the bolt.

In accordance with another aspect of the invention, a tool is constructed to squeezingly engage the upper bolt head and the seated axle for compressing the cushion block. The axle is engaged by the tool on both sides of the bolt shaft.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
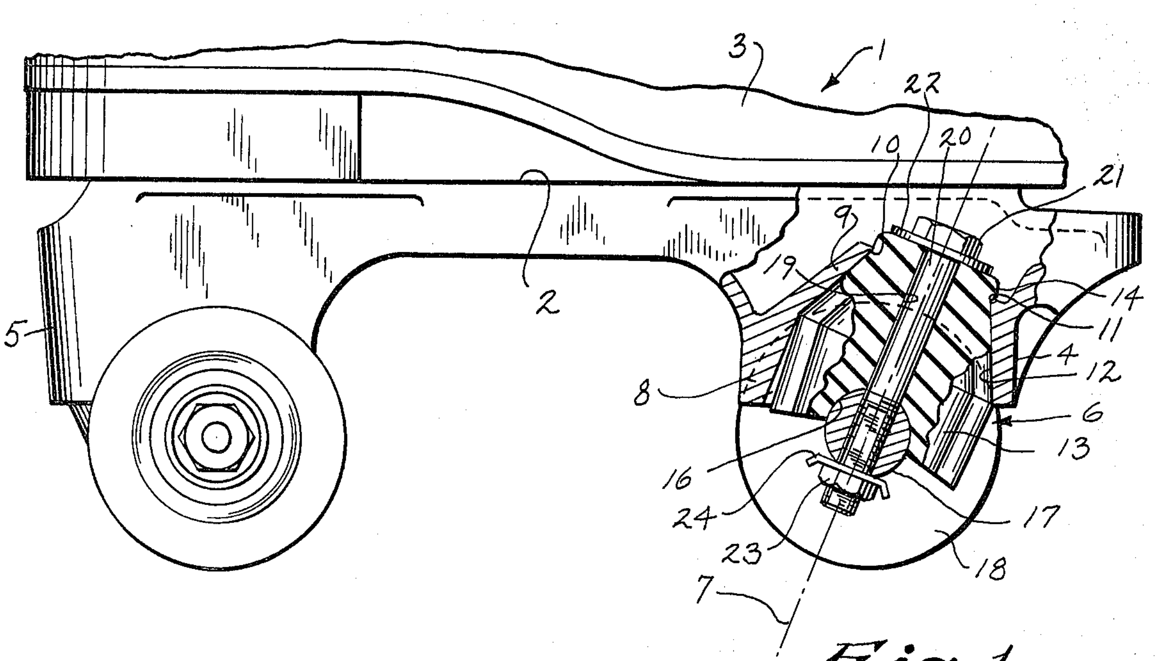
FIG. 1 is a fragmentary side elevation of a roller skate to which the concepts of the invention are applied, and with parts broken away and in section.

As shown in the drawings, the invention is for use in connection with a roller skate 1 having the usual foot plate 2 to which a shoe 3 (shown fragmentarily) is attached in the usual manner. Plate 2 is provided with front and rear downwardly depending sockets 4 and 5 respectively, each of which is adapted to receive a wheel mounting assembly. Since the construction adjacent each socket is generally similar, only the front socket and wheel mounting assembly 6 will be described.

Front socket 4 is shown as having an inclined axis 7 and a generally cylindrical lower wall portion 8 which merges upwardly into a generally conical wall portion 9 with the latter terminating in an upper socket opening 10 having a peripheral shoulder 11. A pair of opposed longitudinal ways 12 are disposed in the socket wall for purposes to be described.

Asssembly 6 includes a resilient deformable cushion block 13 of rubber or the like. Block 13 is generally solid and is formed so that its outer surface generally compliments the inner socket walls. The upper portion of block 13 is formed with an enlarged neck 14 and the lower portion has longitudinal ribs 15 thereon.

To position block 13 within socket 4, it is merely necessary to align ribs 15 with ways 12 and push and squeeze neck 14 through upper socket opening 10 so that the block is wedgingly held in its proper place.

A generally horizontal transversely extending arcuate recess or seat 16 is formed in the lower outer end of block 13. Seat 16 receives an elongated transversely extending solid cylindrical axle member 17. Axle 17 extends outwardly for receiving a pair of skate wheels 18.

Axle 17 is fixedly secured within seat 16. For this purpose, an axial bore 19 extends through cushion block 13 and axle 17, and a bolt 20 is disposed therein. The bolt head 21 is disposed at the top of block 13 and a washer 22 is disposed between head 21 and neck 14.

For purposes of securing assembly 6 together, a nut 23 is threadably mounted on the lower free end of the shaft of bolt 20, remote from head 21, and a washer 24 is disposed between nut 23 and axle 17. Nut 23 should be tightened sufficiently to hold the parts in place against the outward biasing force of the resilient block 13.

Figure 3:
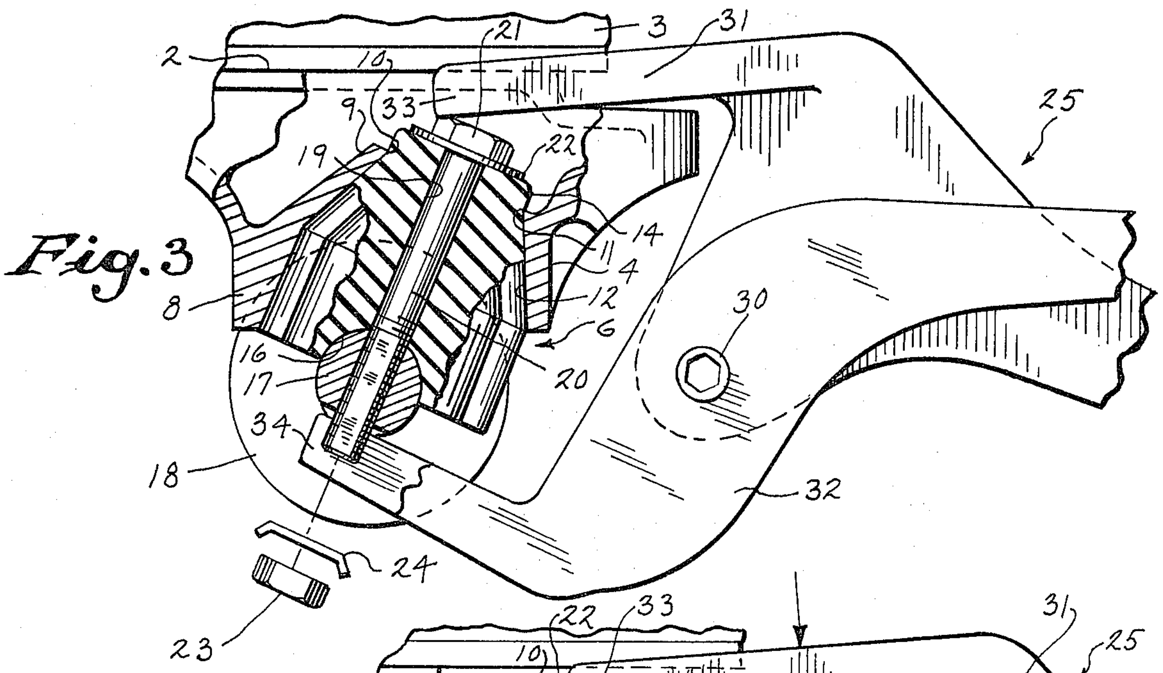
FIG. 3 is an enlarged fragmentary side view showing the cushion block about to be locked in position.
Figure 4:
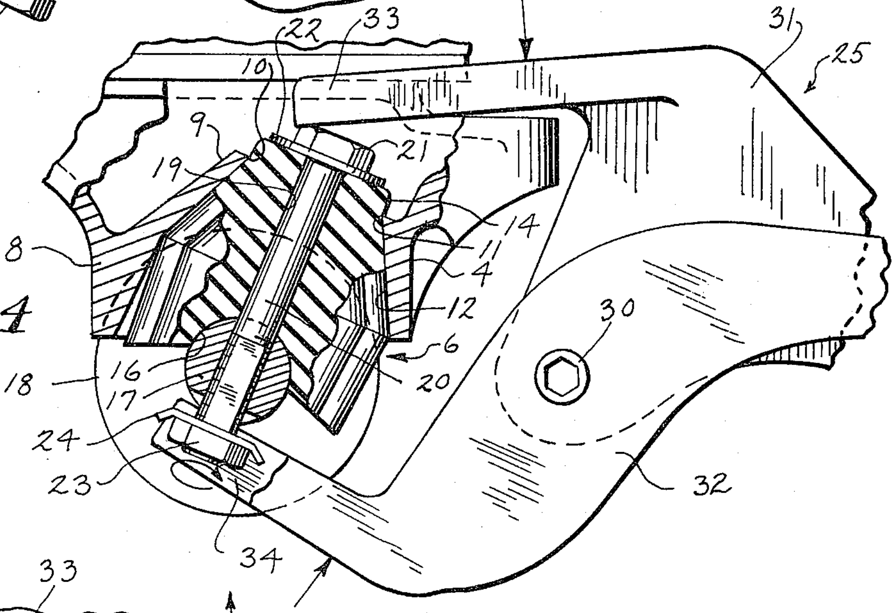
FIG. 4 is a view similar to FIG. 3 and showing the compression being applied to the cushion block.
Figure 5:
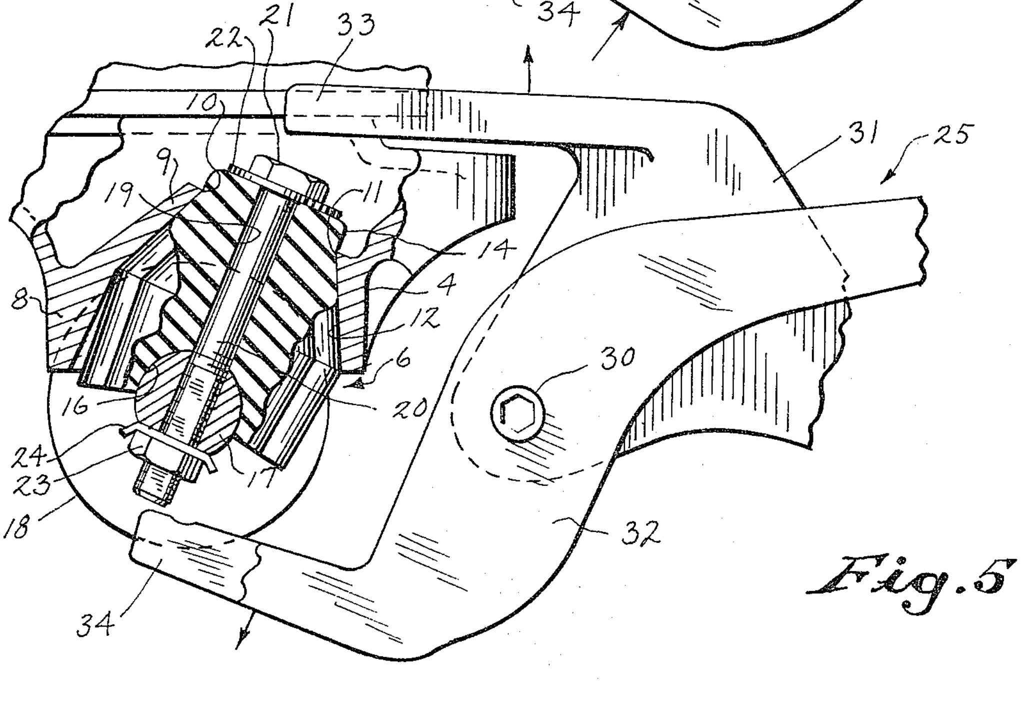
FIG. 5 is a view showing the locked cushion block after release of the tool.

FIGS. 3–5 show utilization of the concepts of the invention in assembling the parts together. Cushion block 13 is first inserted in socket 4 and bolt 20 passed axially therethrough so that head 20 is at the top and the threaded outer bolt end extends downwardly and outwardly of the block. Axle 17 is then passed over the bolt end until it is positioned in seat 16. See FIG. 3.

It is desired to assemble nut 23 and washer 24 onto bolt 20. For this purpose, and as shown in FIG. 4, compressive forces are applied to cushion block 13 so as to deform the lower portion thereof axially inwardly along bolt 20. This is accomplished by pressing axle 17 inwardly against block 13 to thereby increase the length of the exposed end of bolt 20.

Figure 2:
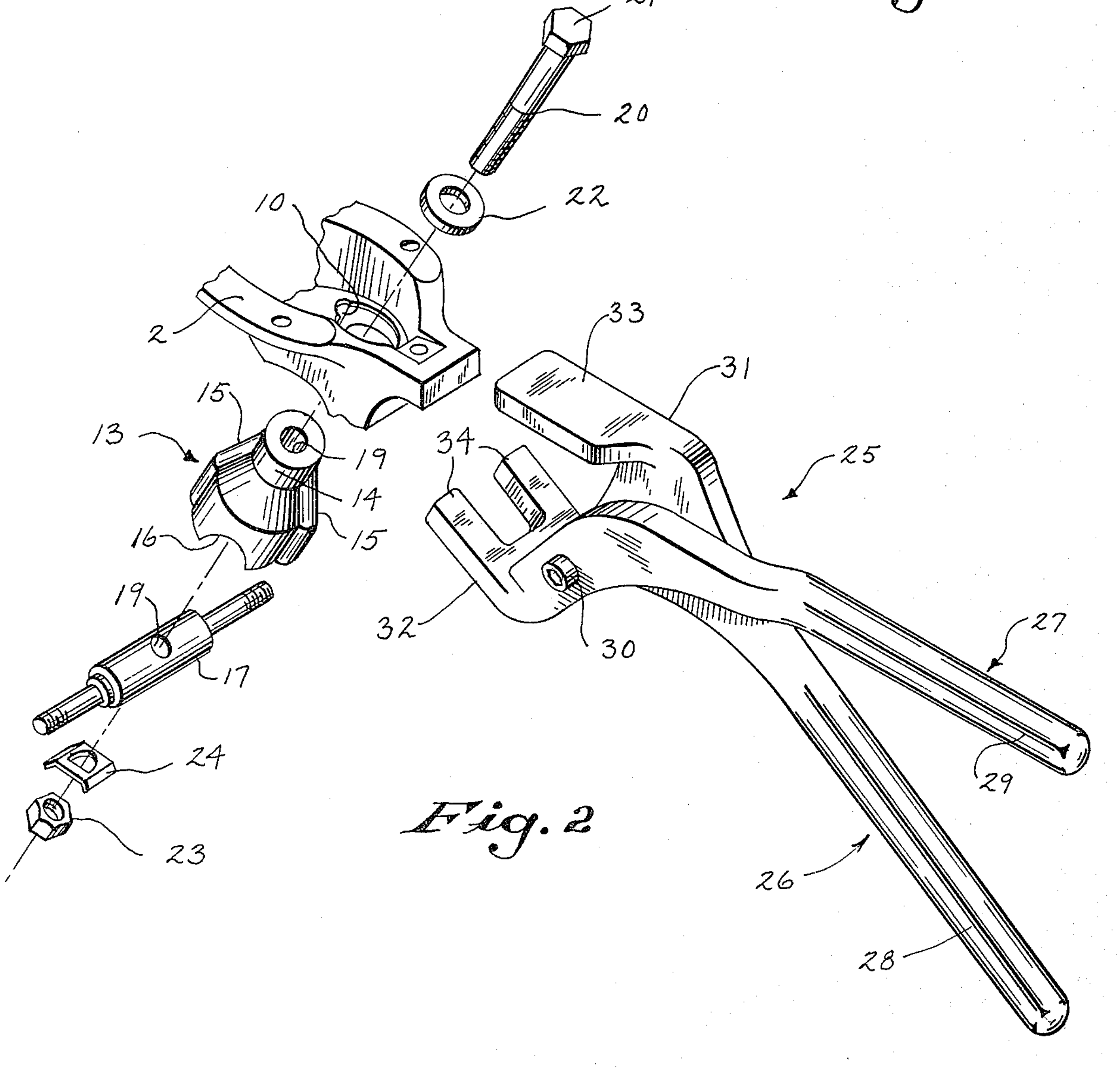
FIG. 2 is an exploded view of the front wheel mounting assembly and showing the tool for compressing the cushion block.

The present embodiment contemplates use of a compressing tool 25 (see especially FIG. 2) having a pair of elongated elements 26, 27 forming handle portions 28, 29 which are pivotally secured together as at 30. On the side of pivot 30 remote from handle portions 28, 29, elements 26, 27 merge into respective gripping portions 31, 32 respectively.

Gripping portion 31 comprises means for engaging bolt head 21 and is shown as a generally flat arm 33. Gripping portion 32 comprises means for engaging axle 17 and is shown as being bifurcated to form a pair of spaced forked arms 34 which engage axle 17 on opposite sides of openings 19. By manually squeezing handle portions 28 and 29 together, arms 33 and 34 are caused to grip bolt head 21 and axle 17 therebetween and axially compress cushion block 13 against socket 4, as shown in FIG. 4. Nut 23 and washer 24 are then applied to the end of bolt 20, with nut 23 being freely threadable along the bolt shaft until it and the washer are closely adjacent axle 17. At this point, and as shown in FIG. 5, the gripping arms 33 and 34 are released, permitting cushion block 13 to spring axially outwardly along bolt 20 and tighten against the assembly of nut 23 and washer 24. As can be seen in FIG. 5, cushion block 13 remains in a partially deformed and compressed state (compare with FIG. 3) so that the outward biasing force of the block and axle binds nut 23 to the threads of bolt 20.

When it is desired to disassemble, the procedure is reversed, thus going from FIG. 5 to FIG. 4 and finally to FIG. 3. Tool 25 squeezingly grips bolt head 21 and axle 17 to compress cushion block 13, thereby freeing nut 23 for unthreading from bolt 20. Once nut 23 and washer 24 are removed, the squeezing force is released causing cushion block 13 to spring axially outwardly along bolt 20 to an uncompressed state. Axle 17 can then be freely removed from bolt 20 and the remaining parts removed from socket 4.

Various modes of carrying out the invention are contemplated as being within the scope of the following claims particularly pointing out and distinctly claiming the subject matter which is regarded as the invention.

I claim:

1. A method of securing a roller skate axle and foot plate together wherein the axle is transversely seated across the outer end portion of a resilient cushion block which extends axially into a socket formed in the foot plate, and wherein a threaded bolt extends axially through the cushion block and with the free end portion of the bolt remote from the bolt head extending through the tranverse central portion of said axle, the steps comprising:

(a) applying a squeezing force between said bolt head and the portions of said axle on either side of said bolt to compress said cushion block against said socket and deform the outer end portion of said block axially inwardly along said bolt, (b) freely threading a nut onto the said free end portion of said bolt until said nut is adjacent said axle, (c) and then releasing said squeezing force so that the outer end portion of said cushion block springs axially outwardly along said bolt to a partially deformed state so that said block causes said seated axle to biasingly bind said nut to said bolt.

* * * * *